US011118081B2

(12) United States Patent
Gokhale

(10) Patent No.: US 11,118,081 B2
(45) Date of Patent: Sep. 14, 2021

(54) ANTIMICROBIAL PACKAGING FILMS

(71) Applicant: Bemis Company, Inc., Neenah, WI (US)

(72) Inventor: Ankush A. Gokhale, Menasha, WI (US)

(73) Assignee: Bemis Company, Inc., Neenah, WI (US)

( * ) Notice: Subject to any disclaimer, the term of this patent is extended or adjusted under 35 U.S.C. 154(b) by 0 days.

(21) Appl. No.: 16/316,293

(22) PCT Filed: Jul. 8, 2016

(86) PCT No.: PCT/US2016/041471
§ 371 (c)(1),
(2) Date: Jan. 8, 2019

(87) PCT Pub. No.: WO2018/009210
PCT Pub. Date: Jan. 11, 2018

(65) Prior Publication Data
US 2019/0161636 A1    May 30, 2019

(51) Int. Cl.
| | | |
|---|---|---|
| *C09D 131/04* | (2006.01) | |
| *A01N 25/10* | (2006.01) | |
| *B29C 48/18* | (2019.01) | |
| *A01N 25/34* | (2006.01) | |
| *B65D 81/28* | (2006.01) | |
| *C09D 123/08* | (2006.01) | |
| *B29D 7/01* | (2006.01) | |
| *C08L 67/04* | (2006.01) | |
| *B29C 48/08* | (2019.01) | |
| *B29C 48/10* | (2019.01) | |

(52) U.S. Cl.
CPC .......... *C09D 131/04* (2013.01); *A01N 25/10* (2013.01); *A01N 25/34* (2013.01); *B29C 48/18* (2019.02); *B29D 7/01* (2013.01); *B65D 81/28* (2013.01); *C08L 67/04* (2013.01); *C09D 123/0853* (2013.01); *B29C 48/08* (2019.02); *B29C 48/10* (2019.02); *C08L 2203/162* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 5,702,716 A | 12/1997 | Dunn et al. | |
| 6,015,816 A | 1/2000 | Kostyniak et al. | |
| 7,993,560 B2 | 8/2011 | Nelson et al. | |
| 8,647,550 B2 | 2/2014 | Nelson et al. | |
| 2003/0198764 A1 | 10/2003 | Kendig | |
| 2005/0158537 A1 | 7/2005 | Aral et al. | |
| 2007/0166344 A1 | 7/2007 | Qu et al. | |
| 2013/0025764 A1 | 1/2013 | Henderson | |
| 2013/0231389 A1 | 9/2013 | Sawyer et al. | |

FOREIGN PATENT DOCUMENTS

| | | |
|---|---|---|
| EP | 0904693 A1 | 3/1999 |
| EP | 0929238 B1 | 1/2003 |
| WO | 1998014073 A2 | 4/1998 |
| WO | 2000061107 A1 | 10/2000 |
| WO | 2011129982 A3 | 10/2011 |

OTHER PUBLICATIONS

Effects of solubilizing surfactants and loading of antiviral, antimicrobial, and antifungal drugs on their release rates from ethylene vinyl acetate copolymer, Tallury et al., Dental Materials, 23 (2007), 977-982 (Year: 2007).*
Tween 60—Sigma Aldrich (Year: 2020).*
Elvax 40 TDS—Dow (Year: 2019).*
Nystatin—Sigma Aldrich (Year: 2006).*
Brody, Aaron L. et al., Antimicrobial Packaging, Active Packaging for Food Applications, Chapter 10, CRC Press LLC (2001).
Han, Jung Hoon, Modeling the Inhibition Kinetics and the Mass Transfer of Controlled Releasing Potassium Sorbate to Develop an Antimicrobial Polymer for Food Packaging, Ph.D. Dissertation, Purdue University (1996).
Hsu, Terry Tsong-Ping et al., Polymers for the controlled release of macromolecules: Effect of molecular weight of ethylene-vinyl acetate copolymer, Journal of Biomedical Materials Research, vol. 19, pp. 445-460, John Wiley & Sons, Inc. (1985).
Kuplennik, Nataliya et al., Antimicrobial packaging based on linear low-density polyethylene compounded with potassium sorbate, LWT-Food Science and Technology (2015), http://dx.doi.org/10.1016/j.lwt.2015.01.002.

* cited by examiner

*Primary Examiner* — Peter A Salamon
(74) *Attorney, Agent, or Firm* — Amy L. De Coster

(57) ABSTRACT

The present invention is directed to packaging films having accelerated migration rates of an antimicrobial agent through a product-contact layer which extends the shelf-life of products packaged therein. The product-contact layer includes an ethylene vinyl acetate (EVA) copolymer having a melt flow index of greater than 6 dg/min at 190 C/2.18 kg, an antimicrobial agent and a wetting agent. In some preferred embodiments, greater than 30% of the initial amount of antimicrobial agent present in the product-contact layer can be released after 21 days upon contact with water. The packaging films can be converted into bags, pillow pouches, stand-up pouches, quad pouches, zipped pouches, overwraps, lidding films, thermoformed trays, vacuum packages, vacuum skin packaging and the like. These films can be used for any product in which it would advantageous to reduce harmful microbial contaminants.

18 Claims, No Drawings ns antimicrobial agents into or onto the packaging material surrounding the food item. However, in general, such attempts have been problematic. With some antimicrobial agents/plastic combinations, the antimicrobial agent becomes encased within the plastic and simply do not migrate to the surface of the film to make contact with the packaged product. More commonly, slow migration kinetics or release rates of antimicrobial agents through the polymer matrix reduces its availability on the film surface leaving the process of food spoilage unaffected. In addition, some antimicrobial agents are rendered ineffective as a result of the high processing temperatures used to process typical packaging films or structures.

ANTIMICROBIAL PACKAGING FILMS

BACKGROUND OF THE INVENTION

The present invention relates generally to primary packaging, and in particular to packaging films containing an antimicrobial agent which significantly extends the shelf-life of products packaged therein.

The following description of the background and embodiments of the invention thereafter is provided to aid in understanding the invention, but is not admitted to describe or constitute prior art to the invention. The contents of the articles, patents, and patent applications, and all other documents and electronically available information mentioned or cited in this application, are hereby incorporated by reference in their entirety to the same extent as if each individual publication was specifically and individually indicated to be incorporated by reference, including any references cited in the articles, patents, patent applications and documents cited herein. Applicant reserves the right to physically incorporate into this application any and all materials and information from any such articles, patents, patent applications, or other documents Microbial contamination of food reduces the quality of food, limits the shelf-life of the food, and increases the risk of food-borne illness to the consumer. A food product can develop an off odor, flavor or appearance due to spoilage bacteria. Contamination occurs primarily on the surface of foods, especially foods such as cheeses and meats. For the food industry, prevention of food spoilage is an important variable when determining profit. Moreover, prevention of food spoilage can prolong the shelf-life of products and thus extend market boundaries, resulting in increased profit. The growth of microorganisms on food products largely occurs post processing during storage, therefore the packaging of the food is extremely important to the quality and shelf life of the food.

The shelf-life of a food product begins from the time the food is finished processing and packaged. The time depends on factors like ingredients, manufacturing process, packaging, distribution storage conditions (temperature, light, etc.). Most food producers determine the shelf-life of their products based upon predictive time-dependent microbiological testing and label their products with a 'sell-by date." The "sell-by date" represents the last day the food product is at its peak quality of freshness, taste, and consistency. Typically, the sell-by date tells the retailer how long to keep the item on the store shelves. For example, when a package of fresh poultry is nearing its sell-by date, the retailer will typically markdown its price. If the product reaches its sell-by date before it is sold, the retailer pulls the poultry from the shelves and the retailer's lost profit is charged back to the poultry producer. Extending the freshness of the poultry and other food products is highly desirable because it assures longer shelf-life and extends the sell-by date of the product. Thus, the longer the product remains on the retailer's shelf, the greater the likelihood of it being sold. For the retailer, this means less waste and fewer markdowns which are conducive to lowering costs. Poultry producers benefit from increased market potential through an expanded geographical export range and fewer charge backs of unsold product. Generally, the shelf-life for fresh chicken is between 14 and 18 days from the date it is packaged.

To control possible microbial contamination and extend the shelf-life of some food products, methods such as aseptic packaging, pre-fill sterilization, and post-fill sterilization have been typically used. However, these methods cannot be used with fresh and minimally processed foods because they often result in undesirable changes in food quality characteristics. Attempts have been made to incorporate antimicrobial agents into or onto the packaging material surrounding the food item. However, in general, such attempts have been problematic. With some antimicrobial agents/plastic combinations, the antimicrobial agent becomes encased within the plastic and simply do not migrate to the surface of the film to make contact with the packaged product. More commonly, slow migration kinetics or release rates of antimicrobial agents through the polymer matrix reduces its availability on the film surface leaving the process of food spoilage unaffected. In addition, some antimicrobial agents are rendered ineffective as a result of the high processing temperatures used to process typical packaging films or structures.

SUMMARY OF THE INVENTION

The embodiments of the present invention are directed to packaging films which delay the onset of microbial spoilage of products packaged in these films. Towards this end, packaging films are described herein having accelerated migration rates of an antimicrobial agent through a product-contact layer. Release of antimicrobial agent from the film's surface is by direct contact with the product surface, through a very thin layer of moisture surrounding the product or through copious liquids, which are generally aqueous, in which the product is immersed.

The migration kinetics of antimicrobial agents are controlled by a product-contact layer comprising at least three components: a polymer matrix comprising an ethylene vinyl acetate copolymer (EVA) having melt flow index of greater than 6 dg/min at 190° C./2.16 kg, an antimicrobial agent, and a wetting agent. Both of the antimicrobial agent and wetting agent can be dispersed within the ethylene vinyl acetate copolymer matrix. It is also contemplated that at least one of the antimicrobial agent and wetting agent can be coated onto the product-contact layer.

Diffusion of antimicrobial agent within the EVA matrix provides rapid release rates of antimicrobial agent to the film's surface. In some preferred embodiments, greater than 10% of the initial amount of antimicrobial agent present in the food-contact layer is released after 2 days, and greater than 15% of the initial amount of antimicrobial agent present in the product-contact layer is released after 7 days upon contact with water. In other preferred embodiments, greater than 20% of the initial amount of antimicrobial agent present in the product-contact layer is released after 14 days upon contact with water. In still other preferred embodiments, greater than 30% of the initial amount of antimicrobial agent present in the product-contact layer is released after 21 days upon contact with water. These migration kinetics refer to release rates of antimicrobial agent from the product-contact layer at 23° C. and 1 atm.

Indeed, it is an object to provide packaging films having fast release kinetics of antimicrobial agent from the film to a packaged product in order to extend the product's shelf-life.

It is another object to provide antimicrobial food packaging films which extend a food product's shelf-life to at least 5, 10, 15, 20 or 25 days.

It is also envisioned that these packaging films may be used with any product in which it would advantageous to reduce harmful microbial contaminants, such as products including, but not limited to, fresh and minimally processed meats and/or seafood, especially fresh poultry such as chicken, duck and goose, fruits (e.g., cut and/or whole fruit), vegetables (e.g., cut and/or whole vegetables), or any other non-comestible products which may harbor harmful contaminants, such as flowers or plants.

The packaging films may be a monolayer film of a product-contact layer or a multilayer film having a product-contact layer with additional layers.

The packaging films may include more layers as needed depending upon the requirements of a particular packaging application. These additional layers may include, but are not limited to oxygen barrier layers, moisture barrier layers, chemical barrier layers, abuse layers, tie or adhesive layers, bulk layers, and odor and oxygen scavenging layers. It is contemplated that the product-contact layer can be combined with many different materials such as, but not limited to, plastics, papers, non-woven materials, metal foils to form various packaging structures. In some preferred embodiments, the packaging films are considered oxygen barrier films and have an oxygen transmission rate ($O_2TR$) value of less than or equal to 10 $cm^3$/100 $in^2$/24 hours at 1 atmosphere, 23° C. and 0% RH.

It is further contemplated that the packaging films can be converted into various packaging configurations, including but not limited to bags, pillow pouches, stand-up pouches, quad pouches, zipped pouches, over-wraps, lidding films, thermoformed trays, vacuum packages, vacuum skin packaging and the like.

As used herein, the term "product-contact layer" refers a layer which is in direct contact with a packaged product. Typically, the product-contact layer of the packaging film is the inner surface of a container formed from the packaging film. The thickness of the product-contact layer can vary between 2.54 μm and 1270 μm (0.1 mil and 50 mil), or between 12.7 μm and 254 μm (0.5 mil and 10 mil), or between 25.4 μm and 127 μm (1 mil and 5 mil).

Also provided herein are multilayered packaging films comprising a packaging film having a product-contact layer as disclosed herein.

Also provided herein are packages, especially food packages. The packages comprise a packaging film having a product-contact layer as disclosed herein.

Further provided herein are packaged food products comprising a food product and a packaging film having a product-contact layer as disclosed herein.

Further provided herein still are methods for extending the shelf-life and/or the sell-by date of a food product. The methods comprise: obtaining any packaging film having a product-contact layer disclosed herein; and packaging a food product within the packaging film.

WORKING EXAMPLES

The Polymer Matrix of the Product-Contact Layer

The use of an ethylene vinyl acetate (EVA) copolymer having a melt flow index of greater than 6 dg/min at 190° C./2.16 kg is an important aspect of the packaging films described herein. Melt flow index (MFI) is a measure of how many grams of a polymer flow through the die in ten minutes expressed as decigrams per minute (dg/min) at a given temperature under a specific mass. The test is performed at a given temperature depending on the plastic. The force used to push the plastic through the system is supplied by a weight which sits on top of a ram. One particularly useful method of determining melt flow index of a thermoplastic material is described in ASTM D1238-13 test method titled Standard Test Method for Melt Flow Rates of Thermoplastics by Extrusion Plastometer by ASTM International, West Conshohocken, Pa. It should be understood that a person skilled in the art can determine the melt flow index of ethylene vinyl acetate (EVA) copolymers by any method known in the art without undue experimentation and is not limited to the aforementioned ASTM test method.

In some preferred embodiments, the ethylene vinyl acetate (EVA) copolymer has a melt flow index of 8 dg/min at 190° C./2.16 kg or higher. In other preferred embodiments, the ethylene vinyl acetate (EVA) copolymer has a melt flow index of 14 dg/min at 190° C./2.16 kg or higher. In still other preferred embodiments, the ethylene vinyl acetate (EVA) copolymer has a melt flow index of 30 dg/min at 190° C./12.16 kg or higher. Suitable examples of these ethylene vinyl acetate (EVA) copolymers which are commercially available include, but are not limited to those sold under the trademark DuPont Elvax® 3174 and 3176 from E. I. du Pont de Nemours and Company, Wilmington, Del. Other suitable commercially available ethylene vinyl acetate (EVA) copolymers include those sold under the trademark Escorene™ Ultra LD 726 by ExxonMobil Chemical Company, Inc., Houston, Tex. It is envisioned that the product-contact layer can also serve as a heat sealing layer in the packaging films described herein.

The Antimicrobial Agent

The antimicrobial agent is one which does not deteriorate during film fabrication, distribution, and storage. The antimicrobial agent is preferably heat stable during extrusion at temperatures that may exceed 200° C., and stable to the shear forces and pressure involved in the process conditions. Also, in some embodiments, the antimicrobial agent used must not adversely affect or discolor the package polymeric materials. The term "antimicrobial agent" describes any water soluble material capable of killing or inhibiting of the growth of bacteria, yeast, fungi, algae, viruses, and/or mold.

In some preferred embodiments, the antimicrobial agent is a GRAS (generally recognized as safe) food additive by the United States Food and Drug Administration (FDA).

The antimicrobial agent used herein are considered a proton donator or derivative thereof. In general, a proton donor is any species capable of donating a proton, for example, Bronsted-Lowry acids which include organic acids such as, but not limited to those selected from the group consisting of acetic acid, adipic acid, benzoic acid, citric acid, glycolic acid, glutaric acid, p-hydroxybenzoic acid, maleic acid, malic acid, malonic acid, phenols, polymeric acids, propionic acid, sorbic acid, sulfurous acid and mixtures thereof. Bronsted-Lowry acids may also include mineral acids such as, but not limited to those selected from the group consisting of boric acid, hydrobromic acid, hydrochloric acid, hydrofluoric acid, hydroiodic acid, nitric acid, phosphoric acid and mixtures thereof.

A proton donator derivative may include a salt of an organic acid and a salt of a mineral acid. Non-limiting examples of salts of an organic acid suitable for use may be selected from the group consisting of potassium sorbate, sodium bisulfite, sodium methyl hydroxybenzoate, sodium propyl hydroxybenzoate, sodium sulfite and mixtures thereof. Other non-limiting examples of proton donator derivatives include anhydride of organic acids and alkyl esters of an organic acids. In some preferred embodiments, the proton donator derivative is selected from the group consisting of methyl p-hydroxybenzoate, propyl p-hydroxybenzoate, butyl p-hydroxybenzoate, ethyl p-hydroxybenzoate, isopropyl p-hydroxybenzoate, isobutyl p-hydroxybenzoate, benzyl p-hydroxybenzoate and mixtures thereof.

In some preferred embodiments, the product-contact layer comprises between 0.08 $g/m^2$ and 9.3 $g/m^2$ (0.124 $mg/in^2$ and 14.42 mg/in$^2$), or between 0.155 g/m$^2$ and 1.55 g/m$^2$ (0.1 mg/in$^2$ and 1 mg/in$^2$), or between 0.31 g/m$^2$ and 1.24 g/m$^2$ (0.2 mg/in$^2$ and 0.8 mg/in$^2$) of antimicrobial agent. In some preferred embodiments, the product-contact layer comprises between 0.1 wt. % and 15 wt. %, or between 0.5 wt. % and 10 wt,%, or between 1 wt. % and 5 wt. % of antimicrobial agent relative to the total weight of the product-contact layer.

The Wetting Agent

It should be understood that the term "wetting agent" used herein may include any substance which increases the mobility of the antimicrobial agent incorporated within the ethylene vinyl acetate of the product-contact layer. The wetting agent may also facilitate or enhance the hydration or contact with an aqueous medium along a face of the product-contact layer. Examples of suitable wetting agents include polyoxyalkylenes (such as those available from BASF under the designation PLURONICS, or those available from Union Carbide under the designation CARBOWAXES, including those with PEGs), ether capped polyoxyalkylenes, e.g., polyoxyethylene lauryl ether, ester capped polyoxyalkylenes, e.g., polyoxyethylene stearate, sorbitan esters (such as certain products commercially available under the designations SPAN and TWEEN), phosphatides (such as lecithin), alkyl amines, glycerin, water soluble polymers such as polyethylene oxides, carboxymethyl cellulose, polyvinyl alcohol, and polyvinyl pyrrolidone, surfactants such as alkyl ($C_6$-$C_{20}$) sulfate salts, e.g., sodium lauryl sulfate, aryl ($C_6$-$C_{10}$) sulfate salts, and alkaryl ($C_7$-$C_{24}$) sulfate salts, and the like.

In some preferred embodiments, the wetting agent comprises a fatty acid adduct selected from the group consisting of glyceryl monostearate, polyoxyethylene monooleate, polyoxyethylene monostearate, polyoxyethylene monolaurate, lisorbitan monooleate, potassium oleate, sodium lauryl sulfate, sodium oleate, sorbitan monolaurate, sorbitan monopalmitate, sorbitan monostearate, sorbitan tristearate, sorbitan monooleate, sorbitan trioleate, triethanolamine oleate, polyoxyethylene sorbitan monolaurate, polyoxyethylene sorbitan monopalmitate, polyoxyethylene sorbitan monostearate, polyoxyethylene sorbitan monostearate, polyoxyethylene sorbitan tristearate, polyoxyethylene sorbitan monooleate, polyoxyethylene sorbitan monooleate, polyoxyethylene sorbitan trioleate, and combinations thereof.

In such preferred embodiments, the wetting agent may also further comprise an ethoxylated alkyl phenol. Non-limiting examples of suitable ethoxylated alkyl phenols are ethoxylated nonyl phenols. A particularly useful combination of substances suitable for use as a wetting agent includes a mixture of sorbitan monolaurate, sorbitan monopalmitate, sorbitan monostearate, lisorbitan monooleate and ethoxylated nonyl phenol which is sold under the trademark Atmer™ 645 by Croda International Plc, Edison, N.J.

In some preferred embodiments, the product-contact layer comprises between 0.0155 g/m$^2$ and 4.65 g/m$^2$ (0.01 mg/in$^2$ and 3 mg/in$^2$), or 0.078 g/m$^2$ and 3.88 g/m$^2$ (0.05 mg/in$^2$ and 2.5 mg/in$^2$), or between 0.155 g/m$^2$ and 3.1 g/m$^2$ (0.1 mg/in$^2$ and 2.0 mg/in$^2$) of wetting agent. In some preferred embodiments, the product-contact layer comprises between 0.1 wt. % and 5 wt. %, or between 0.25 wt. % and 3.5 wt. %, or between 0.5 wt. % and 2.5 wt. % of wetting agent elative to the total weight of the product-contact layer.

Fabrication of Product-Contact Compositions

There are several methods which could be used to produce the product-contact layer compositions. All the components of the product-contact layer may be dry blended in the required weight ratio in a suitable device such as a tumble blender. The resulting dry blend is then melted in suitable equipment such as an extruder. Alternatively, a masterbatch could be prepared by metering the layer components directly into a single- or twin-screw extruder. The specific conditions for operating a single-screw extruder will differ from that of a twin-screw extruder, but those skilled in the art can readily determine the necessary operating conditions needed to prepare masterbatches suitable for use with the present invention.

In some preferred embodiments, the desired amount of antimicrobial agent is dissolved in water and is introduced into a melt of the ethylene vinyl acetate copolymer via a first injection port on a single- or twin-screw extruder. Next, the wetting agent is dissolved in water and injected into the mixture of EVA copolymer melt and antimicrobial agent through a second injection port on the extruder. The water in this mixture is vaporized and exits the extruder via a vent opening on the extruder. The temperatures of the extruder and speed of mixing of the screw will control the quality of the mixing. A uniform dispersion of both antimicrobial and wetting agents within the polymer melt can be achieved. The specific conditions of operation can readily be determined by one skilled in the art. The extruder extrudes the product-contact layer composition as strands which can then cooled and cut into pellets for subsequent use. Particularly useful methods of incorporating the antimicrobial and wetting agents into ethylene vinyl acetate copolymers are described in U.S. Pat. Nos. 7,993,560 and 8,647,550. Finally, the pelletized layer compositions can be extruded as a monolayer film using a single-screw extruder fitted with a slot die head. Those skilled in the art can readily determine the necessary operating temperatures, screw speeds and other processing parameters needed to prepare such monolayer films without undue experimentation.

Extraction Kinetics of the Product-Contact Layer

In order to measure the efficacy of extraction of antimicrobial agent from the product-contact layer, films specimens were prepared by cutting a 120 cm$^2$ sample from a 76.2 micron (3 mil) thick film having a specific product-contact layer composition. The specimens were placed inside a vial with 10 mL of deionized water. Potassium sorbate ($C_6H_7KO_2$) was used as an antimicrobial agent and Atmer™ 645 was used a wetting agent. The cumulative amount of potassium sorbate extracted over time at 23° C. and 1 atm from each film specimen was determined using UV spectroscopy and recorded. The results are shown in Tables 1-5 below. Each value represents the average of three specimens. The product-contact layer composition of each film is identified in each table.

TABLE 1

Product-Contact Layer Composition Example 1
96.7 wt. % EVA Copolymer-1 + 1.2 wt. % Atmer™ 645 + 2.1 wt.
% $C_6H_7KO_2$ (EVA-1 Melt Index = 8 dg/min at 190° C./2.16 kg)

| Time (Days) | Mass of film (grams) | Cumulative Amount of $C_6H_7KO_2$ Extracted (mg/m$^2$) | Total Amount of $C_6H_7KO_2$ in film (mg/m$^2$) | Cumulative Ave. % Extraction of $C_6H_7KO_2$ from film |
|---|---|---|---|---|
| 2 | 0.421 | 68.2 | 722.23 | 9.5 ± 0.4 |
| 7 | 0.421 | 82.6 | 722.30 | 11.9 ± 0.3 |
| 14 | 0.421 | 91.45 | 722.30 | 12.9 ± 0.13 |
| 21 | 0.421 | 92.54 | 722.30 | 13 ± 0.19 |

EVA Copolymer-1 was an ethylene vinyl acetate copolymer having an 18 wt. % vinyl acetate content, a density of 0.940 g/cm³, a melting point of 65° C. which was sold under the trademark DuPont Elvax 3174 by E. I. du Pont de Nemours and Company, Wilmington, Del.

TABLE 2

Product-Contact Layer Composition Example 2
96.6 wt. % EVA Copolymer-2 + 1.1 wt. % Atmer™ 645 + 2.3 wt. % $C_6H_7KO_2$ (EVA-2 Melt Index = 14 dg/min at 190° C./2.16 kg)

| Time (Days) | Mass of film (grams) | Cumulative Amount of $C_6H_7KO_2$ Extracted (mg/m²) | Total Amount of $C_6H_7KO_2$ in film (mg/m²) | Cumulative Ave. % Extraction of $C_6H_7KO_2$ from film |
|---|---|---|---|---|
| 2 | 0.442 | 178.25 | 830.80 | 21.5 ± 0.11 |
| 7 | 0.442 | 232.50 | 830.80 | 28.02 ± 0.2 |
| 14 | 0.442 | 246.92 | 830.34 | 29.7 ± 0.71 |
| 21 | 0.442 | 251.10 | 957.90 | 30.15 ± 0.25 |

EVA Copolymer-2 was an ethylene vinyl acetate copolymer having an 18 wt. % vinyl acetate content, a density of 0.939 g/cm³, a melting point of 82.8° C. which was sold under the trademark Escorene™ Ultra LD 726.07 by ExxonMobil Chemical Company, Houston, Tex.

TABLE 3

Product-Contact Layer Composition Example 3
95.7 wt. % EVA Copolymer-3 + 1.5 wt. % Atmer™ 645 + 2.8 wt. % $C_6H_7KO_2$ (EVA-3 Melt Index = 30 dg/min at 190° C./2.16 kg)

| Time (Days) | Mass of film (grams) | Cumulative Amount of $C_6H_7KO_2$ Extracted (mg/m²) | Total Amount of $C_6H_7KO_2$ in film (mg/m²) | Cumulative Ave. % Extraction of $C_6H_7KO_2$ from film |
|---|---|---|---|---|
| 2 | 0.419 | 120.90 | 957.90 | 12.6 ± 0.23 |
| 7 | 0.419 | 184.92 | 957.90 | 19.6 ± 0.97 |
| 14 | 0.419 | 230.95 | 957.90 | 24.17 ± 1.16 |
| 21 | 0.419 | 269.24 | 957.90 | 28.2 ± 0.86 |

EVA Copolymer-3 was an ethylene vinyl acetate copolymer having an 18 wt. % vinyl acetate content, a density of 0.940 g/cm³, a melting point of 65° C. which was sold under the trademark DuPont Elvax 3176 by E. I. du Pont de Nemours and Company, Wilmington, Del.

TABLE 4

Product-Contact Layer Composition Example 4
93 wt. % EVA Copolymer-3 + 4 wt. % Atmer™ 645 + 3 wt. % $C_6H_7KO_2$ (EVA-3 Melt Index = 30 dg/min at 190° C./2.16 kg)

| Time (Days) | Mass of film (grams) | Cumulative Amount of $C_6H_7KO_2$ Extracted (mg/m²) | Total Amount of $C_6H_7KO_2$ in film (mg/m²) | Cumulative Ave. % Extraction of $C_6H_7KO_2$ from film |
|---|---|---|---|---|
| 2 | 0.739 | 189.57 | 661.39 | 14.29 ± 0.67 |
| 7 | 0.737 | 253.74 | 622.64 | 20.14 ± 1.6 |
| 14 | 0.737 | 377.12 | 622.64 | 29.74 ± 2.9 |
| 21 | 0.737 | 496.00 | 622.64 | 38.8 ± 2.93 |

TABLE 5

Product-Contact Layer Composition Comparative Example 1
97.08 wt. % EVA Copolymer-4 + 1 wt. % Atmer™ 645 + 1.92 wt. % $C_6H_7KO_2$ (EVA-4 Melt Index = 0.7 dg/min at 190° C./2.16 kg)

| Time (Days) | Mass of film (grams) | Cumulative Amount of $C_6H_7KO_2$ Extracted (mg/m²) | Total Amount of $C_6H_7KO_2$ in film (mg/m²) | Cumulative Ave. % Extraction of $C_6H_7KO_2$ from film |
|---|---|---|---|---|
| 2 | 0.497 | 52.70 | 803.37 | 6.6 ± 0.17 |
| 7 | 0.497 | 67.12 | 803.37 | 8.3 ± 0.4 |
| 14 | 0.497 | 69.29 | 803.37 | 8.6 ± 0.2 |
| 21 | 0.497 | 116.72 | 803.37 | 9.2 ± 0.3 |

EVA Copolymer-4 was an ethylene vinyl acetate copolymer having an 18 wt. % vinyl acetate content, a density of 0.940 g/cm³, a melting point of 89° C. which was sold under the trademark DuPont. Elvax 3165 by E. I. du Pont de Nemours and Company, Wilmington, Del.

TABLE 6

Product-Contact Layer Composition Comparative Example 2
96.2 wt. % EVA Copolymer-3 + 3.8 wt. % $C_6H_7KO_2$ (EVA-3 Melt Index = 30 dg/min at 190° C./2.16 kg)

| Time (Days) | Mass of film (grams) | Cumulative Amount of $C_6H_7KO_2$ Extracted (mg/m²) | Total Amount of $C_6H_7KO_2$ in film (mg/m²) | Cumulative Ave. % Extraction of $C_6H_7KO_2$ from film |
|---|---|---|---|---|
| 2 | 0.770 | 44.80 | 685.72 | 6.73 ± 0.36 |
| 7 | 0.754 | 67.27 | 687.43 | 9.78 ± 0.27 |
| 14 | 0.758 | 66.34 | 687.43 | 9.46 ± 0.37 |
| 21 | 0.754 | 72.39 | 687.43 | 10.5 ± 0.32 |

As evident from Examples 1-4 and Comparative Example 1, the average amount of antimicrobial agent released from the product-contact layer upon contact with water was greater than 10% of the initial amount of antimicrobial agent present in the layer after 7 days when the ethylene vinyl acetate copolymer had a melt index of 8 dg/min at 190° C./2.16 kg or higher. In some preferred embodiments, greater than 20% of the initial amount of antimicrobial agent present in the food-contact layer was extracted after 14 days when the ethylene vinyl acetate copolymer had a melt index of 14 dg/min at 190° C./216 kg or higher. In other preferred embodiments, greater than 30% of the initial amount of antimicrobial agent present in the food-contact layer was extracted after 21 days when the ethylene vinyl acetate copolymer had a melt index of 30 dg/min at 190° C./2.16 kg or higher. When comparing the data for Example 4 with Comparative Example 2, it should be evident that when no wetting agent is present in the product-contact layer, the amount of potassium sorbate extracted from this layer is significantly lower than those compositions with wetting agent, i.e., at most 10% of the initial amount present after 21 days even though the melt index of the ethylene vinyl acetate was 30 dg/min at 190' C./2.16 kg.

Preparation of Packaging Films with Product-Contact Layer

Multilayer packaging films having a product-contact layer as described herein were fabricated by blown film coextrusion methods. Other alternative conventional coextrusion methods can also be used including slot cast coextrusion, extrusion lamination, extrusion coating and combinations of blown film coextrusion with one or more alternative methods. In a preferred blown film coextrusion embodiment, the multilayer packaging film was produced using multiple extruders which fed into a multi-manifold circular die head through which the film layers are forced and formed into a cylindrical multilayer film bubble. The bubble was quenched, then collapsed and formed into a multilayer film. Blown film extrusion processes are known in the art and have been described, for example, in The Encyclopedia of Chemical Technology, Kirk-Othmer, 3rd ed., John Wiley & Sons, New York, 1981, Vol. 16, pp. 416-417 and Vol. 18, pp. 191-192.

Seven-layer packaging films were fabricated by blown film coextrusion. The layer compositions are described in TABLES 7-8 below. Each of the two films included a product-contact layer comprising EVA-3 which has a melt index of 30 dg/min at 190° C./2.16 kg. The amount of potassium sorbate in the films was varied by the relative thickness of the product-contact layer, i.e., Example 2 had a product-contact layer thickness approximately twice that of Example 1, hence the amount of potassium sorbate in Example 2 was approximately twice that of Example 1.

TABLE 7

Multilayer Packaging Film Example 1
Total thickness = 44.45 μm (1.75 mil)

| Layer | Composition |
|---|---|
| Layer 1 (Product-contact/ Sealant) | 86.6 wt. % of EVA-3 + 10.9 wt. % potassium sorbate + 2.5 wt. % Atmer ™ 645 [Thickness = 19.56 μm (0.77 mil) & Concentration of potassium sorbate = 1.55 g/m$^2$] |
| Layer 2 | 80 wt. % of EVA Copolymer-4 + 20 wt. % of an anhydride modified linear low density polyethylene (mod-LLDPE) |
| Layer 3 | 100 wt. % of Nylon 6 |
| Layer 4 | 100 wt. % of Ethylene vinyl alcohol copolymer (EVOH) |
| Layer 5 | 100 wt. % of Nylon 6 |
| Layer 6 | 90 wt. % of a Very low density polyethylene (VLDPE) + 10 wt. % of an anhydride modified linear low density polyethylene (mod-LLDPE) |
| Layer 7 | 53.2 wt. % of a Linear low density polyethylene (LLDPE) + 38 wt. % of ethylene vinyl acetate copolymer (EVA-5) having a melt index of 0.35 dg/min at 190° C./2.16 kg + 7.8 wt. % processing additives |

TABLE 8

Multilayer Packaging Film Example 2
Total thickness = 88.9 μm (3.5 mil)

| Layer | Composition |
|---|---|
| Layer 1 (Product-contact/ Sealant) | 86.6 wt. % of EVA-3 + 10.9 wt. % potassium sorbate + 2.5 wt. % Atmer ™ 645 [Thickness = 35.6 μm (1.4 mil) & Concentration of potassium sorbate = 3.1 g/m$^2$] |
| Layer 2 | Same as Example 1 |
| Layer 3 | Same as Example 1 |
| Layer 4 | Same as Example 1 |
| Layer 5 | Same as Example 1 |
| Layer 6 | Same as Example 1 |
| Layer 7 | Same as Example 1 |

Antimicrobial Activity of Packaging Films

Antimicrobial tests were performed with the seven-layer packaging films of Examples 1-2 described above and a Control Example of a monolayer of low density polyethylene (LDPE) having a thickness of 50.8 μm (2 mil). For each of the three test groups, a total of nine packages were made containing a bone-less, skin-less chicken breast weighing approximately 200 grams each. It should be noted that the chicken was store brought and had lost 3 to 5 days of shelf-life. Each package had approximately 258.1 cm$^2$ (40 in$^2$) of surface area of film in contact with the chicken breast. Three samples of chicken breast from each test group were removed from their package for enumeration of bacteria colonies (CFU) after 3, 7, 10, 12, 14, 18, and 20 days. The remaining packaged chicken was maintained at 4° C. for the duration of the experiment. When the chicken was removed from the vacuum package, it was placed in a sterile bag containing 50 mL of cold Butterfield's buffer. The bag was vigorously agitated for 2 minutes and then opened in a biosafety cabinet. A one mL aliquot of solution was removed from the bag for serial dilution in additional buffer solution. A sample of the diluted solution was then spread across an agar plate. The plate was allowed to dry and incubated for 48 hours at 24° C. The total bacteria population on the plate was determined by visible inspection. The results are reported as colony forming units (CFU's) in exponential ($\log_{10}$) growth per gram of chicken. TABLE 9 below summarizes the measured antimicrobial activity test results of the studied films.

TABLE 9

Antimicrobial Activity

| | Total Plate Count (Log 10 CFU/g) | | |
|---|---|---|---|
| Days after Packaging | Control Example (non-vacuum packaged) | Example 1 (vacuum packaged) | Example 2 (vacuum packaged) |
| 3 | 4.01 | 2.7 | 3 |
| 7 | 6.8 | 4.1 | 3.5 |
| 10 | 7.9 | 4.4 | 4.2 |
| 12 | >8 | 4.8 | 4.8 |
| 14 | >8 | 5.0 | 4.7 |
| 16 | >8 | 5.2 | 4.3 |
| 18 | >8 | 4.9 | 4.3 |
| 20 | >8 | 5.3 | 4.9 |

The above-described data demonstrate the antimicrobial efficiency of the packaging films at extending the shelf-life of a packaged meat product when the film includes a product-contact layer formed from an ethylene vinyl acetate copolymer with a melt index greater than 6 dg/min at 190' C./216 kg, antimicrobial agent and a wetting agent. Also evident is that the packaging films have an antimicrobial activity of less than $\log_{10}$ 7 cfu/g as measured by the total plate count (TPC) up to 20 days after the film is in contact with a food product.

The above description and examples illustrate certain embodiments of the present invention and are not to be interpreted as limiting. Selection of particular embodiments, combinations thereof, modifications, and adaptations of the various embodiments, conditions and parameters normally encountered in the art will be apparent to those skilled in the art and are deemed to be within the spirit and scope of the present invention.

What is claimed:
1. A packaging film comprising:
  at least a product-contact layer comprising:
    i) an ethylene vinyl acetate copolymer having melt flow index of greater than 6 dg/min at 190° C./2.16 kg;
    ii) an antimicrobial agent; and
    iii) a wetting agent;
  wherein the wetting agent comprises a fatty acid adduct selected from the group consisting of glyceryl monostearate, polyoxyethylene monooleate, polyoxyethylene monostearate, polyoxyethylene monolaurate, lisorbitan monooleate, potassium oleate, sodium lauryl sulfate, sodium oleate, sorbitan monolaurate, sorbitan monopalmitate, sorbitan monostearate, sorbitan tristearate, sorbitan monooleate, sorbitan trioleate, triethanolamine oleate, polyoxyethylene sorbitan mono- laurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, and combinations thereof, and wherein the wetting agent further comprises an ethoxylated alkyl phenol.

2. The packaging film according to claim 1, wherein the average cumulative amount of antimicrobial agent released from the product-contact layer upon contact with water is greater than 10% of the initial amount of antimicrobial agent present in the food-contact layer after 2 days at 23° C. and 1 atm.

3. The packaging film according to claim 1, wherein the average cumulative amount of antimicrobial agent released from the product-contact layer upon contact with water is greater than 20% of the initial amount of antimicrobial agent present in the product-contact layer after 14 days at 23° C. and 1 atm.

4. The packaging film according to claim 1, wherein the average cumulative amount of antimicrobial agent released from the product-contact layer upon contact with water is greater than 30% of the initial amount of antimicrobial agent present in the product-contact layer after 21 days at 23° C. and 1 atm.

5. The packaging film according to claim 1, wherein the film has an antimicrobial activity of less than $\log_{10} 7$ CFU/g as measured by the total plate count (TPC) up to 20 days after the film is in contact with a food product.

6. The packaging film according to claim 1 wherein the amount of antimicrobial agent present in the product-contact layer is between 0.08 and 9.3 $g/m^2$.

7. The packaging film according to claim 1, wherein the ethylene vinyl acetate copolymer has melt flow index equal to or greater than 8 dg/min at 190° C./2.16 kg.

8. The packaging film according to claim 1, wherein the ethylene vinyl acetate copolymer has a vinyl acetate content of at least 18 wt.-%.

9. The packaging film according to claim 1, wherein the antimicrobial agent comprises a proton donator or derivative thereof.

10. The packaging film according to claim 9, wherein the proton donator is an organic acid selected from the group consisting of acetic acid, adipic acid, benzoic acid, citric acid, glycolic acid, glutaric acid, p-hydroxybenzoic acid, maleic acid, malic acid, malonic acid, phenols, polymeric acids, propionic acid, sorbic acid, sulfurous acid and mixtures thereof.

11. The packaging film according to claim 9, wherein the proton donator derivative is a salt of an organic acid.

12. The packaging film according to claim 11, wherein the organic acid is selected from the group consisting of potassium sorbate, sodium bisulfite, sodium methyl hydroxybenzoate, sodium propyl hydroxybenzoate, sodium sulfite and mixtures thereof.

13. The packaging film according to claim 9, wherein the proton donator is a mineral acid selected from the group consisting of boric acid, hydrobromic acid, hydrochloric acid, hydrofluoric acid, hydroiodic acid, nitric acid, phosphoric acid and mixtures thereof.

14. The packaging film according to claim 13, wherein the proton donator is a salt of a mineral acid.

15. The packaging film according to claim 9, wherein the proton donator derivative is an anhydride of an organic acid.

16. The packaging film according to claim 9, wherein the proton donator derivative is an alkyl ester of an organic acid.

17. The packaging film according to claim 16, wherein the alkyl ester of an organic acid is selected from the group consisting of methyl p-hydroxybenzoate, propyl p-hydroxybenzoate, butyl p-hydroxybenzoate, ethyl p-hydroxybenzoate, isopropyl p-hydroxybenzoate, isobutyl p-hydroxybenzoate, benzyl p-hydroxybenzoate and mixtures thereof.

18. The packaging film according to claim 1, wherein the ethoxylated alkyl phenol is ethoxylated nonyl phenol.

\* \* \* \* \*

UNITED STATES PATENT AND TRADEMARK OFFICE
CERTIFICATE OF CORRECTION

PATENT NO. : 11,118,081 B2
APPLICATION NO. : 16/316293
DATED : September 14, 2021
INVENTOR(S) : Ankush A. Gokhale It is certified that error appears in the above-identified patent and that said Letters Patent is hereby corrected as shown below:

In the Specification

Column 5, Line 6, replace "10 wt,%" with -- 10 wt.% --

Column 5, Line 61, replace "elative" with -- relative --

Signed and Sealed this
Third Day of January, 2023

Katherine Kelly Vidal
*Director of the United States Patent and Trademark Office*